United States Patent [19]

Takashimizu et al.

[11] Patent Number: 5,432,612
[45] Date of Patent: Jul. 11, 1995

[54] MULTI-MODE VIDEO SIGNAL PLAYBACK AND DISPLAY DEVICE

[76] Inventors: Satoru Takashimizu, Hitachi-Keimei-Ryo #249, 850 Maioka-cho, Totsuka-ku; Fumio Inoue, 1130-36 Kashio-cho, Totsuka-ku, both of Yokohama-shi, Kanagawa-ken 244; Hiroyuki Torii, Yorii Apt. #513, 391-2 Tabiko; Jun Kobayashi, Meishin-Ryo #706, 426-3 Tabiko, both of Katsuta-shi, Ibaraki-ken 312, all of Japan

[21] Appl. No.: 558,521

[22] Filed: Jul. 27, 1990

[30] Foreign Application Priority Data

Jul. 28, 1989 [JP] Japan .................. 1-194084

[51] Int. Cl.6 ............................ H04N 9/87
[52] U.S. Cl. .................................. 358/310
[58] Field of Search ........... 358/310, 335, 342, 148, 358/150, 11, 12, 21 R, 140, 183, 236, 241; 348/739, 790, 800, 805; H04N 9/87, 9/79

[56] References Cited

U.S. PATENT DOCUMENTS

| 4,532,555 | 7/1985 | Sagara et al. | 358/310 |
| 4,694,348 | 8/1987 | Kamiya et al. | 358/236 |
| 4,873,583 | 10/1989 | Kobayashi | 358/310 |
| 4,914,523 | 4/1990 | Maruta | 358/310 |
| 4,963,991 | 10/1990 | Honjo | 358/310 |
| 4,996,596 | 2/1991 | Hirao et al. | 358/158 |

FOREIGN PATENT DOCUMENTS 64-3391  1/1989  Japan .

Primary Examiner—Tommy P. Chin
Assistant Examiner—Robert Chevalier
Attorney, Agent, or Firm—Antonelli, Terry, Stout & Kraus

[57] ABSTRACT

A multi-mode display device is made integral with a multi-mode video signal recording and play-back device to enable a control circuit and a control signal to be made in common to each other, With this arrangement, a circuit size can be reduced and at the same time a circuit configuration can be simplified. In addition, an operation of a circuit not related with the play-back signal is controlled or stopped by using a common control circuit and then a consumption power can be reduced.

8 Claims, 11 Drawing Sheets

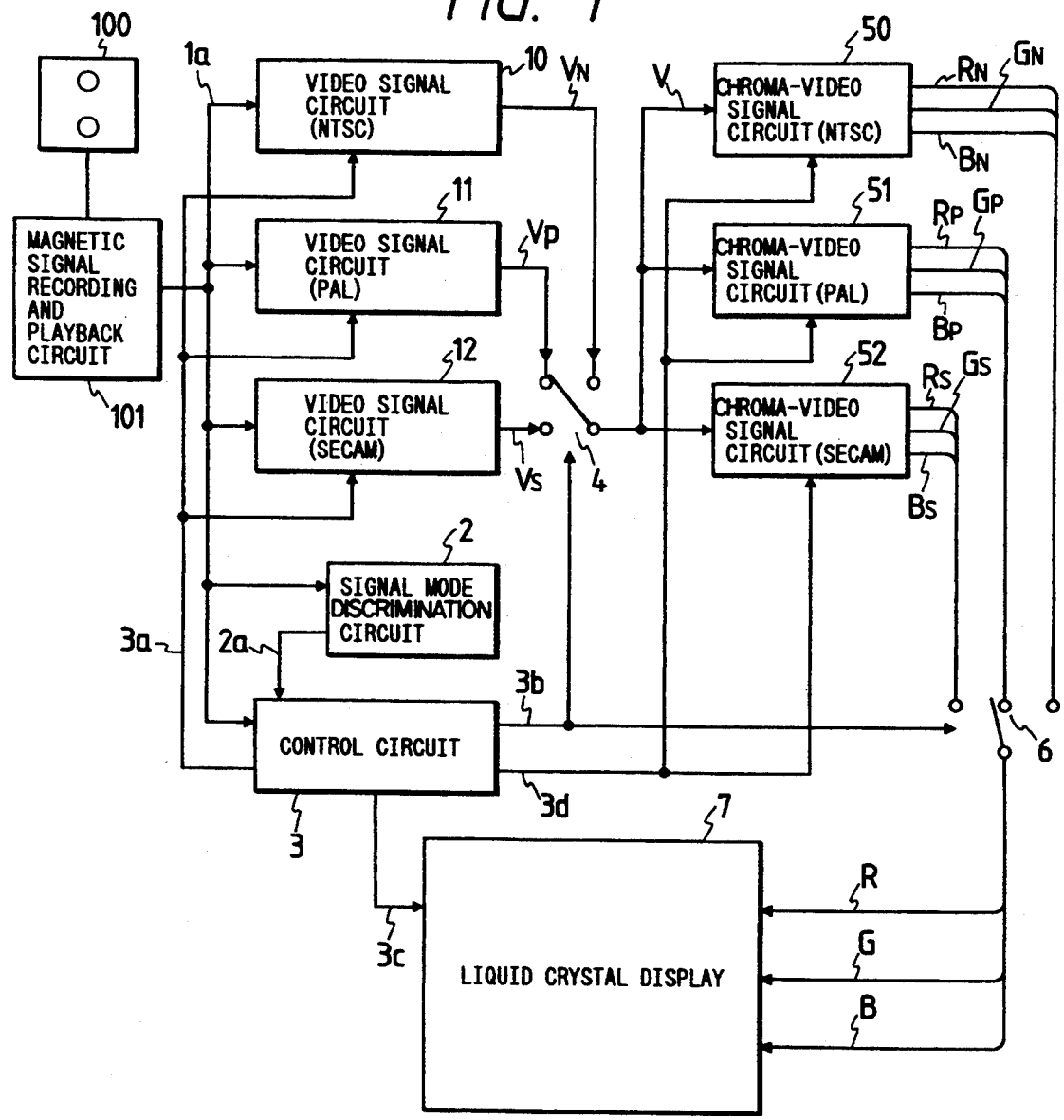

MULTI-MODE VIDEO SIGNAL PLAYBACK AND DISPLAY DEVICE

BACKGROUND OF THE INVENTION

This invention relates to an operation control circuit and an operation control method in a multi-mode displaying device integral with a video signal recording and playback device.

As described in Japanese Patent Publication No. Sho 64-3391, a conventional multi-mode displaying device is disclosed as in itself an independent device, mode discrimination of an input video signal or changing-over control operation of circuits is performed under control of an exclusive control circuit provided in conventional the multi-mode displaying device.

The aforesaid conventional multi-mode displaying device had some problems, being that there was no arrangement for performing a discrimination of a signal mode thus circuit size and power consumption was increased this occurred due to the fact that in case of playing-back and displaying a signal recorded on a recording medium under a connection with the multi-mode video signal playing-back device, the multi-mode video signal recording and playing-back device discriminated once the mode of signal reproduced from the recording medium and outputted it to the conventional multi-mode displaying device, therefore the multi-mode video signal recording and playing-back device and the conventional multi-mode displaying device operate independently from each other.

SUMMARY OF THE INVENTION

It is an object of the present invention to reduce or simplify a size of a circuit configuration of a multi-mode displaying device.

It is another object of the present invention to reduce of consumption power of the multi-mode displaying device.

In order to accomplish the aforesaid objects, the multi-mode displaying device and the multi-mode video signal recording and playing-back device are made integral to each other, and a circuit for discriminating the video signal modes and various control circuits capable of being commonly utilized are made in common with the aforesaid multi-mode displaying device and the aforesaid multi-mode video signal recording and play-back circuit, respectively.

In order to accomplish the other objects described above, the multi-mode displaying device and the multi-mode video signal recording and playing-back device are made integral to each other, in which an operation of a circuit not related to the playing-back signal is controlled or stopped by applying a circuit which is common with the aforesaid multi-mode display device and the aforesaid video signal recording and playing-back circuit.

The multi-mode displaying device and the multi-mode video signal recording and playing-back device are made integral to each other to have a common control circuit, thereby it is not necessary to provide a separate control circuit r for each of the aforesaid multi-mode displaying device and the aforesaid multi-mode video signal recording and playing-back circuit and thus a size of the circuit can be reduced. Due to the fact that the common control circuit is utilized, the control signal is commonly applied in the multi-mode displaying device and the multi-mode video signal recording and playing-back circuit so as to simplify the configuration of the device and then the operation modes of the recording and playing-back circuit and the displaying circuit when the playing-back operation is carried out can be positively unified.

In addition, by applying the aforesaid common control signal to control or stop the operation of non-used circuit, it is possible to reduce a consumption power or eliminate any non-required interference such as beat or the like.

BRIEF DESCRIPTION OF THE DRAWINGS

FIG. 1 is a block diagram for showing a multi-mode display device integral with the video signal recording and play-back device acting as one preferred embodiment of the present invention.

FIG. 2 is an illustrative view for showing a recording mode classified by a signal mode in a VHS standard.

DETAILED DESCRIPTION OF THE PREFERRED EMBODIMENTS

Figure 3:
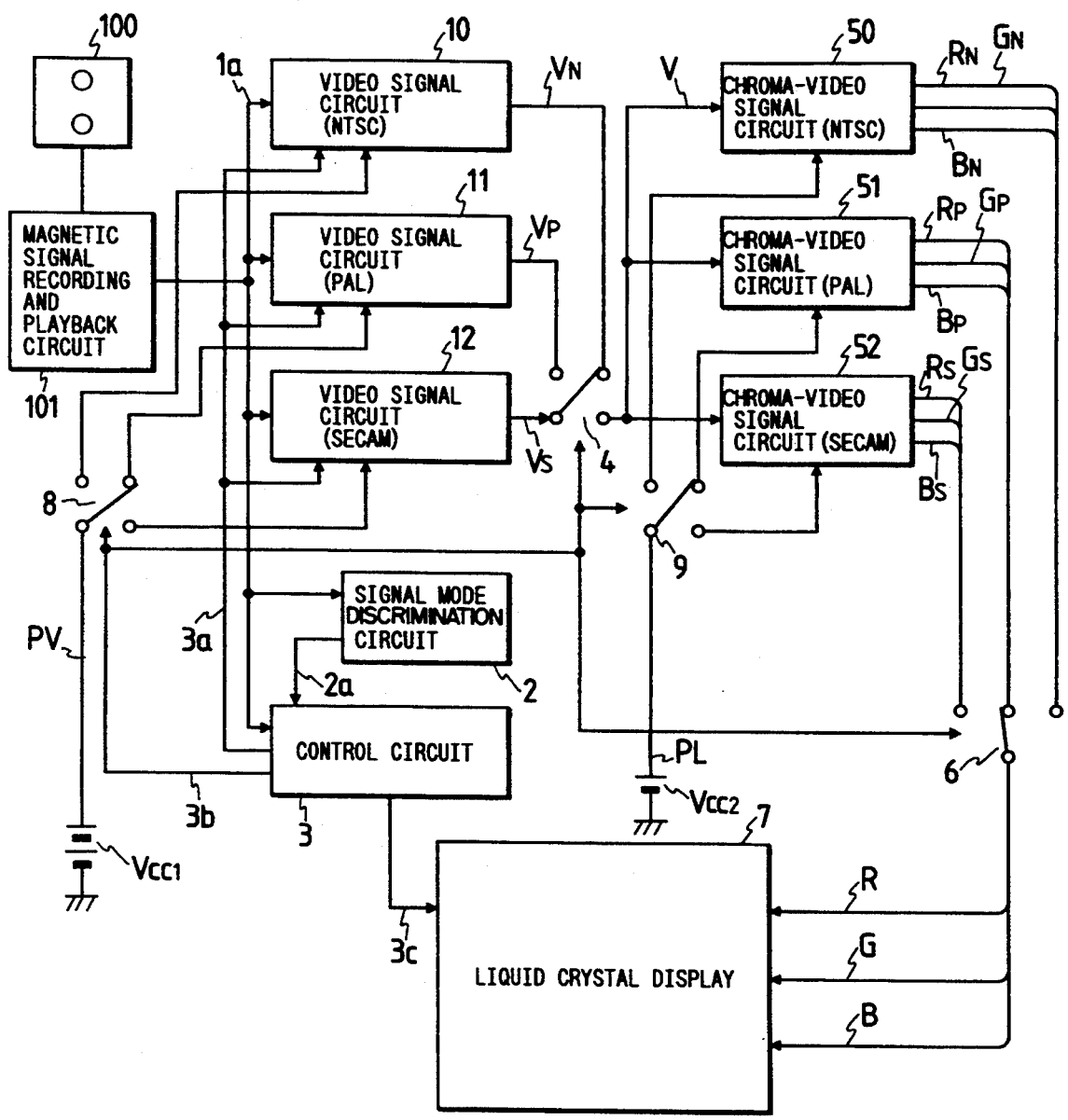
FIG. 3 is a block diagram for showing a multi-mode display device integral with a video signal recording and play-back device as a second preferred embodiment of the present invention.

Referring now to FIG. 1, one preferred embodiment of the present invention will be described.

FIG. 1 is a block diagram for showing a configuration of a liquid crystal displaying device integral with a video tape recorder (hereinafter called a liquid crystal displaying device integral with VTR) of the present invention.

In this figure, in general, a signal processing circuit system before a switch 4 can be considered as a VTR part, and each of the modes of croma-video signal processing circuits 50, 51 and 52 and a displaying device 7 can be considered as a displaying part, wherein the preferred embodiment shown in FIG. 1 illustrates a system in which the aforesaid VTR and the displaying device are substantially made integral to each other.

Reference numeral 100 denotes a video tape of VHS standard, 1a denotes a playing-back signal of an electrical signal obtained through playing-back of a magnetic signal recorded in the video tape 100 by a magnetic signal recording and playing-back circuit 101, 10 denotes an NTSC mode video signal processing circuit of a VHS standard, 11 denotes a PAL mode video signal processing circuit of a VHS standard, 12 denotes a SECAM mode video signal processing circuit of a VHS standard, 2 denotes a signal discriminating circuit for in discriminating a mode of the playing-back signal 1a, 2a denotes a discriminating signal for showing a result of discrimination of a signal in the signal mode discriminating circuit 2, 3 denotes a control circuit, 3a denotes a control signal for use in controlling the operations of the NTSC mode, 10 PAL 11 mode and an SECAM mode video signal processing circuits, 3b denotes a switch changing-over signal, 3c denotes a display control signal, 3d denotes a timing signal of a horizontal synchronizing signal, for example, each of $V_N$, $V_P$ and $V_S$ denotes a composite video signal of the NTSC mode, PAL mode and SECAM mode, 4 and 6 denote signal changing-over switches, V denotes a composite video signal obtained as an output of the signal changing-over switch 4. 50, 51 and 52 denote croma-video signal processing circuits of each of NTSC mode, PAL mode and SECAM mode. $R_N$, $G_N$, $B_N$ and $R_P$, $G_P$, $B_P$ as well as $R_S$, $G_B$, $B_S$ denote primary color signals of red, green and blue of outputs of each of NTSC mode, PAL mode and SECAM mode croma-video signal processing circuits 50, 51 and 52. R, G and B denote primary color signals obtained as the outputs from the signal changing-over switch 6. 7 denotes a liquid crystal displaying device.

Operation of playing-back and displaying a signal recorded in the video tape 100 will be described as follows.

A playing-back signal 1a reproduced from the video tape 100 by the magnetic signal recording and playing-back circuit 101 is applied to each of the NTSC mode, PAL mode and SECAM mode video signal processing circuits 10, 11 and 12, respectively, and at the same time applied to a signal mode discriminating circuit 2. The signal mode discriminating circuit 2 may discriminate the signal as follows, for example. At first, since the NTSC mode has a vertical frequency of 60 Hz, the PAL mode and the SECAM mode have a vertical frequency of 50 Hz, so that a detection of the aforesaid vertical frequency enables a discrimination of whether the mode is an NTSC mode or a PAL mode or an SECAM mode. In addition, the PAL mode and the SECAM mode have different standards for color signals, so that a detection of this difference enables the PAL mode and the SECAM mode to be discriminated. In regards to the VHS standard, each of the NTSC mode, PAL mode and SECAM mode has such a recording mode as one shown in FIG. 2, respectively. The playing-back signal 1a contains information showing which mode of FIG. 2 the aforesaid playing-back signal 1a correspond to. The signal mode discriminating circuit 2 may discriminate the mode of the playing-back signal 1a and output the result of discrimination as a discriminating signal 2a.

The discriminating signal 2a is applied to the control circuit 3, and the control circuit may output a control signal 3a in response to the aforesaid discriminating signal 2a. Each of the video signal processing circuits 10, 11 and 12 of the NTSC mode, PAL mode and SECAM mode may process the playing-back signal 1a in response to the control signal 3a applied so as to output a plurality of video signals $V_N$, $V_P$ or $V_S$. Operation of the signal processing circuit other than the selected mode at this time may consume not only a non-required electrical power but also cause an interference by production of non-required signal or an interference of beat, so that it is preferable to terminate the operation of the signal processing circuit other than the selected mode.

The preferred embodiment having this function will be described in detail later in reference to FIG. 2. The aforesaid complex video signals $V_N$, $V_P$ and $V_S$ are applied to the signal changing-over switch 4. The signal changing-over switch 4 performs a changing-over operation in response to a switch changing-over signal 3b applied from the control circuit 3 and then any one of the complex video signals $V_N$, $V_P$ and $V_S$ can be attained as an output complex video signal V of the signal changing-over switch 4. At this time, if the signal mode discrimination circuit 2 judges that a playing-back signal 1a is a signal of PA1 mode, the control circuit 3 may apply the changing-over signal 3b to the signal changing-over switch 4 in response to the discrimination signal 2a indicating the discrimination result so as to change-over the signal changing-over switch 4 to enable the complex video signal $V_P$ of PAL mode to be attained as the output complex video signal V.

Then, the complex video signal V and the timing signal 3d are applied to the NTSC mode, PAL mode and SECAM mode croma-video signal circuits 50, 51 and 52 so as to get any of the primary color signals of at least $R_N$, $G_N$, $B_N$, $R_P$, $G_P$, $B_P$, $R_S$, $B_S$ as the outputs of each of the croma-video signal circuits 50, 51 and 52 of the aforesaid NTSC mode, PAL mode and SECAM mode, respectively. At this time, it is preferable to constitute such that only any of the croma-video signal circuits 50, 51 is operated in the same manner as that of the aforesaid video signal circuits 10, 11 and 12. Each of the primary color signals $R_N$, $G_N$, $B_N$, $R_P$, $G_P$, $B_P$, $R_S$, $G_S$ and $B_S$ is applied to the signal changing-over switch 6, respectively. The changing-over of the signal changing-over switch 6 is controlled by the switch changing-over signal 3b in the same manner as that of the aforesaid signal changing-over switch 4. Accordingly, in a case such as that described above, the complex video signal $V_P$ of PAL mode is obtained as an output complex video signal V of the signal changing-over switch 4, the changing-over of the signal changing-over switch 6 is carried out in such a way as the output primary color signals $R_P$, $G_P$, $B_P$ of croma-video signal circuits 51 of PAL mode may be attained as an output of the signal changing-over switch 6.

The output primary color signals R, G, B of the signal changing-over switch 6 are applied to the liquid crystal display device 7. A display control signal 3c is simultaneously applied to the aforesaid liquid crystal display device 7, the liquid crystal display device 7 may control a display timing in response to the aforesaid display control signal 3c and display in reference to the content of each of the aforesaid primary color signals R, G, and B.

In the above description, the displaying part comprised of a VTR part having as its major part NTSC mode, PAL mode and SECAM mode video signal processing circuits 10, 11 and 12, and the NTSC mode, PAL mode and SECAM mode croma-video signal circuits 50, 51, 52 and the liquid crystal display device 7 are not and independent separate from each other, but are combined one unit, so that a control circuit for use in controlling a changing-over between the signal changing-over switches 4 and 6 can be used in common between the VTR part further the displaying part, and it is not necessary to provide a control circuit separately for each of the portions, with a result that its configuration can be simplified and at the same time power simple configuration enables a consumption to be saved. In addition, in case of the PAL mode or SECAM mode where a special playing-back such as a fast feeding search is carried out with a video tape recorded under an LP mode shown in FIG. 2, the colors are not correctly displayed in principle and a quality of display is remarkably deteriorated, so that in case that the aforesaid special playing-back operation is carried out under the LP mode of PAL or SECAM mode a signal for use in diminishing the colors is outputted as the control signal 3a of an output of the control circuit 3 and then the colors of the displayed image can be diminished and quality of the displayed image can be prevented from being remarkably deteriorated.

Another preferred embodiment of the present invention will be illustrated in FIG. 3. In FIG. 3, reference numerals 8 and 9 denote a power supply changing-over switch, $V_{cc1}$ denotes a power supply for NTSC, PAL and SECAM mode video signal circuits, PV denotes an output of the power supply $V_{cc1}$, $V_{cc2}$ denotes a power supply for NTSC mode, PAL mode and SECAM mode croma-video signal circuits and PL denotes an output of the power supply $V_{cc2}$.

A video signal of PAL mode is recorded in the video tape 100 and a circuit operation shown in FIG. 3 in which the aforesaid PAL video signal is played back will be described.

In FIG. 3, if the signal mode discrimination circuit 2 judges that the playing-back signal 1a applied to the signal mode discrimination circuit 2 is a signal of PAL mode, the control circuit 3 may output the switch changing-over signal 3b in response to the discrimination signal 2a for indicating the result of discrimination. The aforesaid switch changing-over signal 3b is applied to the signal changing-over switches 4 and 6 for use in changing-over a complex video signal and a primary color signal to be outputted and also applied to the power supply changing-over switches 8 and 9. In this way, the switch changing-over signal 3b is applied to the power supply changing-over switches 8 and 9, thereby the power supply changing-over switches 8 and 9 are changed over to each other. With this arrangement, the switch changing-over signal 3b is applied to the power supply changing-over switches 8 and 9 to cause the power supply changing-over switches 8 and 9 to be changed over. With this operation, the output PV of the power supply $V_{cc1}$ and the output PL of the power supply $V_{cc2}$ are applied to only each of the PAL mode video signal circuit 11 and the PAL mode croma-video signal circuit 51, respectively.

In case that the replaying-back of the PAL mode video signal is carried out, the power supply is supplied only to the PAL mode video signal circuit 11 and the PAL mode croma-video signal circuit 51, and then no power supply is supplied to the remaining NTSC mode and SECAM mode video signal circuits 10, 12 and 50, 52.

As described above, since a changing-over of the signal and the power supply changing-over switches 4, 6 and 8, 9 can be carried out only with one control signal by applying one control circuit 3, the configuration can be simplified more as compared with a system in which each of the VTR part and the displaying part is provided with a control circuit and a control signal is supplied for every changing-over switches.

In addition, since the power supply is not supplied to the circuit not requiring any operation, it is possible to reduce the electrical power applied to the VTR part and the displaying part as compared with the case in which all the circuits are operated without being relation to the system of the playing-back signal 1a.

Figure 4:
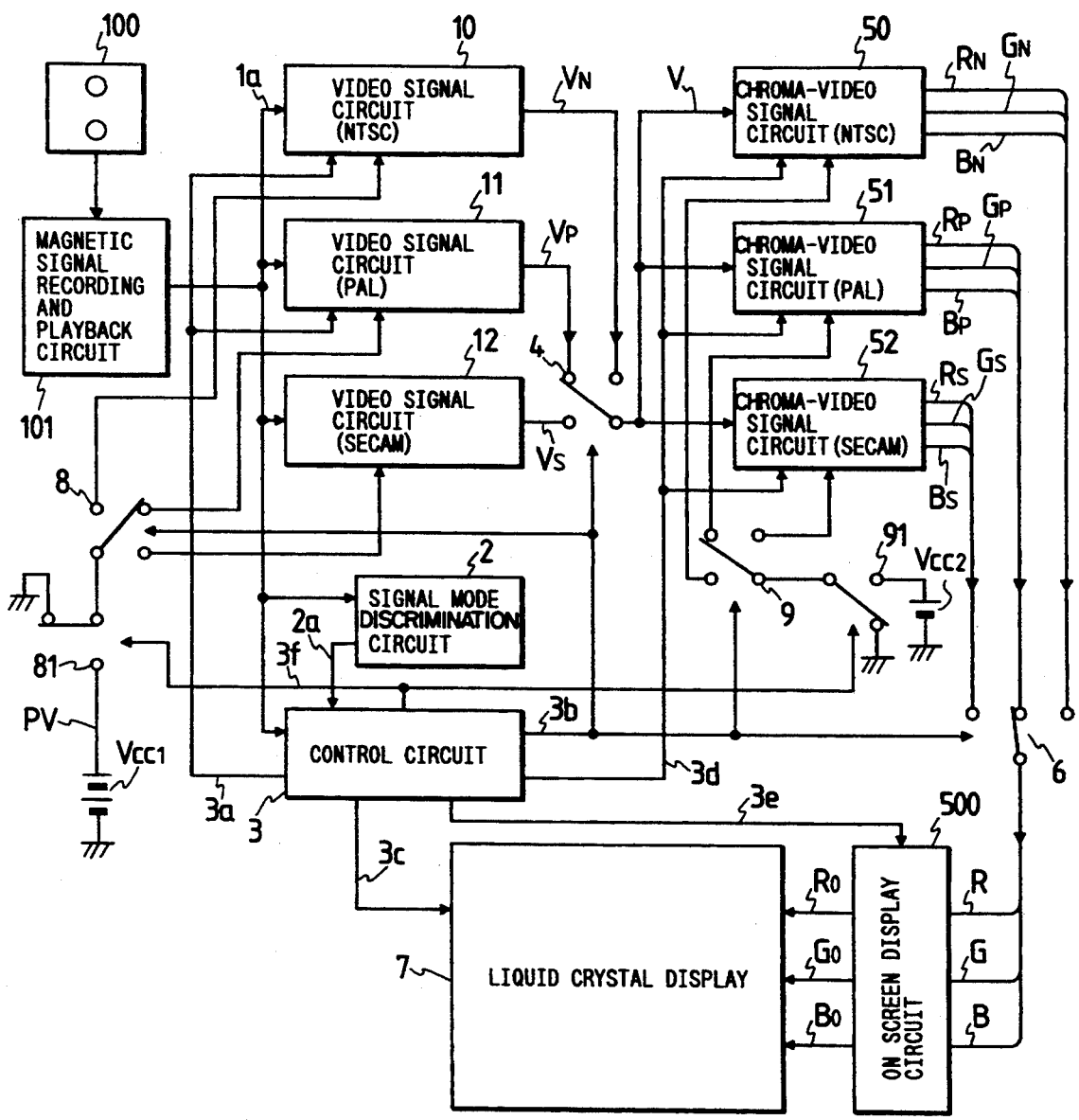
FIG. 4 is a block diagram for showing a multi-mode display device integral with a video signal recording and play-back device as a third preferred embodiment of the present invention.

A still another preferred embodiment of the present invention is illustrated in FIG. 4. In FIG. 4, reference numeral 30 denotes a control circuit, i.e. a control circuit 81 having a function to generate characters or figure information to be displayed on the screen, reference numeral 91 denotes a power supply switch, 500 denotes an on-screen display circuit, 3e denotes an on-screen display signal, 3f denotes control signals of the power supply switches 81 and 91, and Ro, Go and Bo denote a primary color singal including the on-screen information. The on-screen display circuit 500 may display the information such as a mode of the playing-back signal 1a during a playing-back operation, for example, in response to the on-screen display signal 3e.

In FIG. 4, in case that there is no signal showing no presence of recorded information in the video tape 100, it is discriminated that no presence of signal is detected by the signal mode discrimination circuit 2. Then, the result of discrimination is outputted to the control circuit 3 by the discrimination signal 2a. In case that the applied discrimination signal 2a shows no presence of signal, the control circuit 30 may change over the power supply switches 81 and 91 with the control-signal 3f so as to prohibit the power supply from being applied to all the video signal circuits and the croma-video signal circuits 50, 51 and 52 of the NTSC mode, PAL mode and SECAM mode. The control circuit 30 may output the on-screen displaying signal 3e to the on-screen displaying circuit 500. The on-screen displaying circuit 500 may cause the liquid crystal display device 7 to display in response to the content of the applied on-screen display signal 3e.

An arrangement position of the on-screen display circuit 500 is not limited to the location shown in FIG. 4, but it may be arranged before or at the middle of or after the NTSC, PAL, SECAM mode video signal circuits 10, 11 and 12 and further it may be arranged at the middle of or after the output of the switch or NTSC, PAL, SECAM croma-video signal circuits 50, 51 and 52, respectively. One of the preferred embodiments will be illustrated in FIG. 10 and described later.

Figure 5:
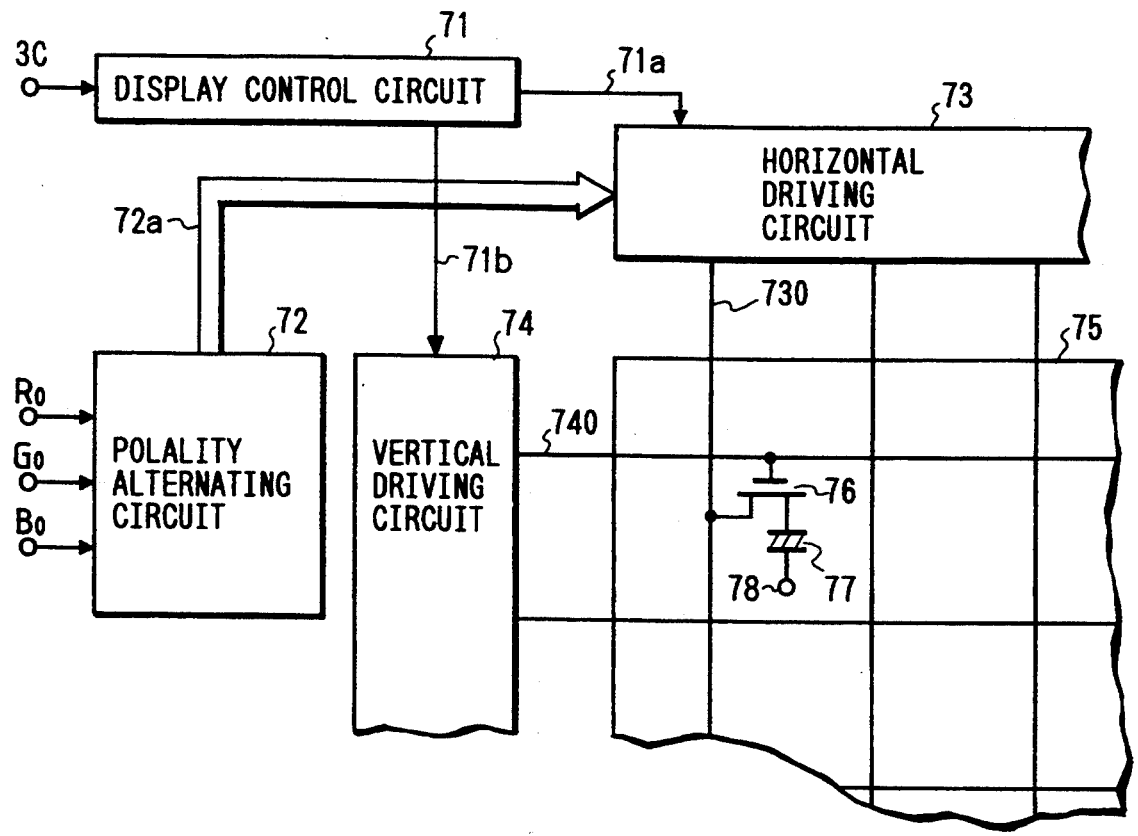
FIG. 5 is a block diagram for showing an example of configuration of a liquid crystal display device in FIGS. 1 to 4.

In FIG. 5 is illustrated one example of a configuration of an active matrix mode displaying device of the liquid crystal displaying device 7. Reference numeral 71 denotes a displaying control circuit, 71a a horizontal driving control circuit, 71b a vertical scanning control signal, 72 a polarity alternating circuit, 72a a polarity alternating singal, 73 a horizontal driving circuit, 730 a horizontal driving electrode, 74 a vertical scanning circuit, 740 a vertical scanning electrode, 75 a displaying part, 76 a MOS transistor, 77 a liquid crystal element, 78 a common electrode for applying the same electrical potential to all the liquid crystal elements 77.

In FIG. 5, the primary color signals Ro, Go, Bo applied the polarity alternating circuit 72 are reversed at their polarities, and the polarity alternating signals 72a of a positive polarity and a negative polarity are applied to the horizontal driving circuit 73. In turn, the displaying control circuit 71 may form the horizontal driving signal 71a and the vertical scanning signal 71b in response to the applied displaying control signal, apply them to the horizontal driving circuit 73 and the vertical scanning circuit 74 as as to control their operations. The horizontal driving circuit 73 may sample the polarity alternating signal 72a applied in response to the horizontal driving signal 71a and output the sampled voltage to each of the horizontal driving electrodes 730. A voltage is applied in sequence to each of the vertical scanning electrodes 740 by the vertical scanning circuit 74 in response to applied vertical scanning signal 71b so as to perform a vertical scanning operation. The MOS transistor 76 becomes ON state when a voltage is applied to the gate through the vertical scanning electrodes 740, thereby the display having the applied signal voltage of the horizontal driving electrode 730 written into the liquid crystal 77 is carried out.

Figure 6:
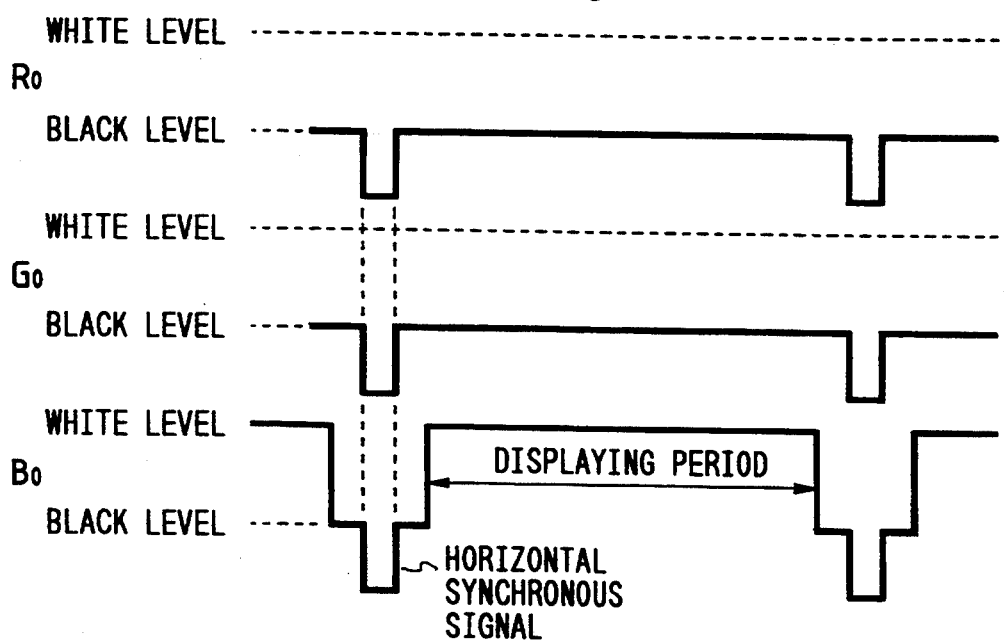
FIG. 6 is a wave-form figure for showing examples of practical wave-forms of primary color signals $R_o$, $G_o$ and $B_o$ in FIG. 4.

In FIG. 5, in case that the content of display is not varied in view of time, for example, a so-called blue-back display for displaying a blue color over an entire screen is carried out, a specified voltage for use in carrying out a display to the primary color signal Bo of the inputs of the polarity alternating circuit 72, and at the same time a specified voltage for preventing the display may be applied to Ro and Go. In this case, the input primary color singals Ro, Go and Bo of the liquid crystal displaying device 7 may not necessarily be a video signal including the horizontal synchronous signal shown in FIG. 6. That is, in case that only the on-screen display is carried out, any of the croma-video signal circuits 50, 51 and 52 of NTSC, PAL and SECAM modes are not necessarily be operated, but a specified voltage may be supplied as the primary color signals Ro, Go and Bo only for a predetermined period of time required for the display from the on-screen display circuit 500 (In case of the aforesaid blue-back display, the specified voltage may always be applied as the primary color signals Ro, Go and Bo.)

Accordingly, under a condition in which no signal is supplied to the video tape 100, if the on-screen display is to be carried out, it is not necessary to supply the power to each of the NTSC mode, PAL mode and SECAM mode video signal circuits 10, 11, 12 and croma-video signal circuits 50, 51 and 52 and thus a consumption power can be reduced.

Figure 7:
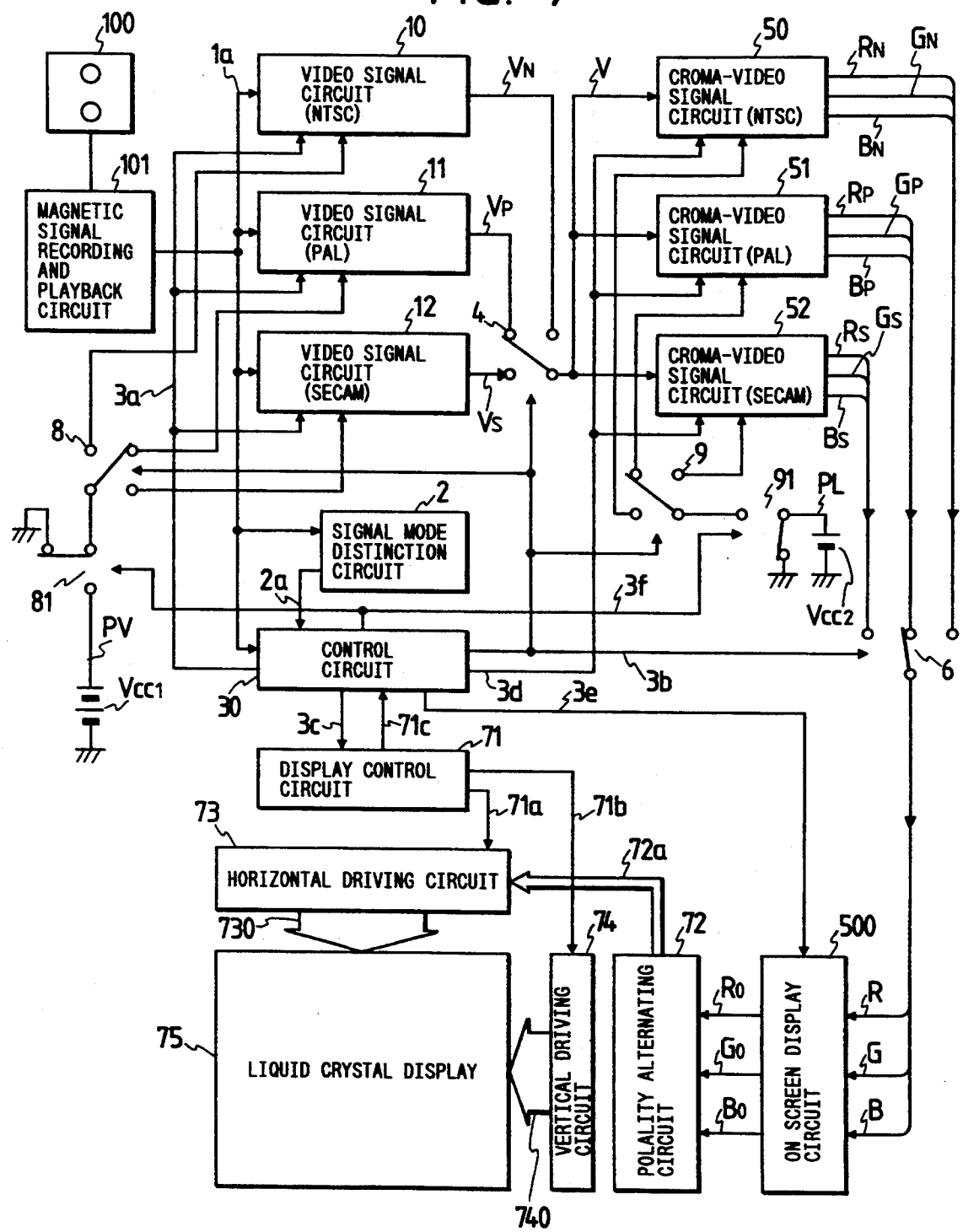
FIG. 7 is a block diagram for showing a multi-mode display device integral with a video signal recording and play-back device as a fourth preferred embodiment of the present invention.

FIG. 7 is a configuration figure for showing a still further preferred embodiment of the present invention. A different feature of the preferred embodiment shown in FIG. 7 from that of the preferred embodiment shown in FIG. 4 consists in the fact that a timing signal 71C is supplied from the displaying control circuit 71 to the control circuit 30. As the displaying control signal outputted from the control circuit 30, for example, there is a method for using the horizontal and vertical synchronous signals. However, when there is no signal in which no signal is recorded in the video tape 100 and when an intensity of a tuner (not shown) input electric field is quite weak, it is not possible to get a positive aforesaid horizontal vertical synchronous signal. Accordingly, it is assumed that in case of performing an on-screen display at these times, a mere output of the on-screen information 3e from the control circuit 30 does not cause a timing of on-screen displaying information to be coincided with a timing between the horizontal driving control signal 71a and the vertical scanning signal 71b formed by the display control circuit 71 and then the display may be disturbed.

In order to prevent the aforesaid disturbance of display, in case of the preferred embodiment shown in FIG. 7, the timing signal 71c is outputted from the displaying control circuit 71 and this is applied to the control circuit 30, thereby the timing of the on-screen displaying information 3e is coincided with the horizontal driving signal 71a and the vertical scanning signal 71b so as to prevent the displayed content from being disturbed.

Figure 8:
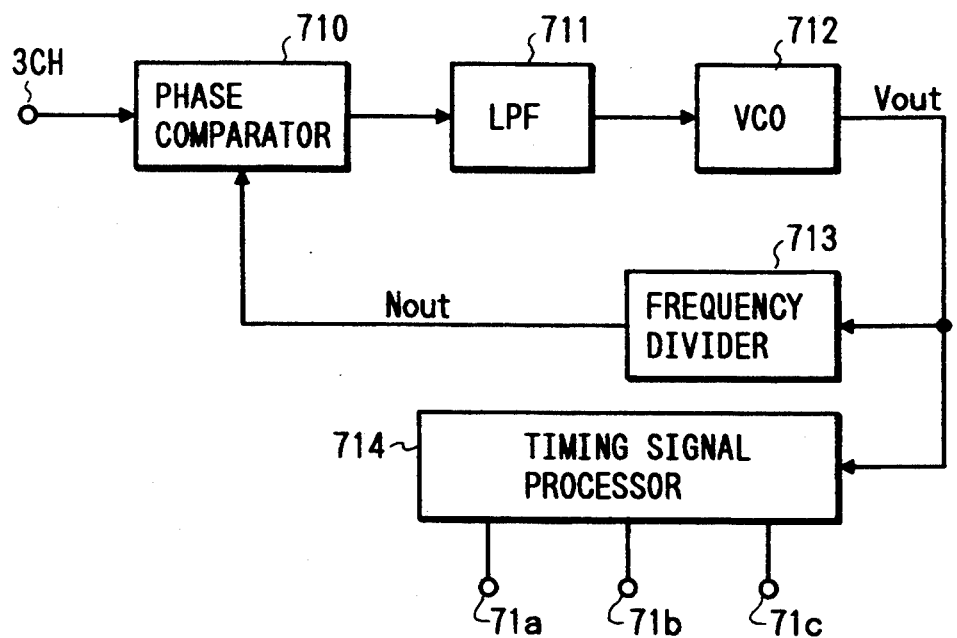
FIG. 8 is a block diagram for showing an example of a configuration of the displaying control circuit in FIG. 7.
Figure 9:
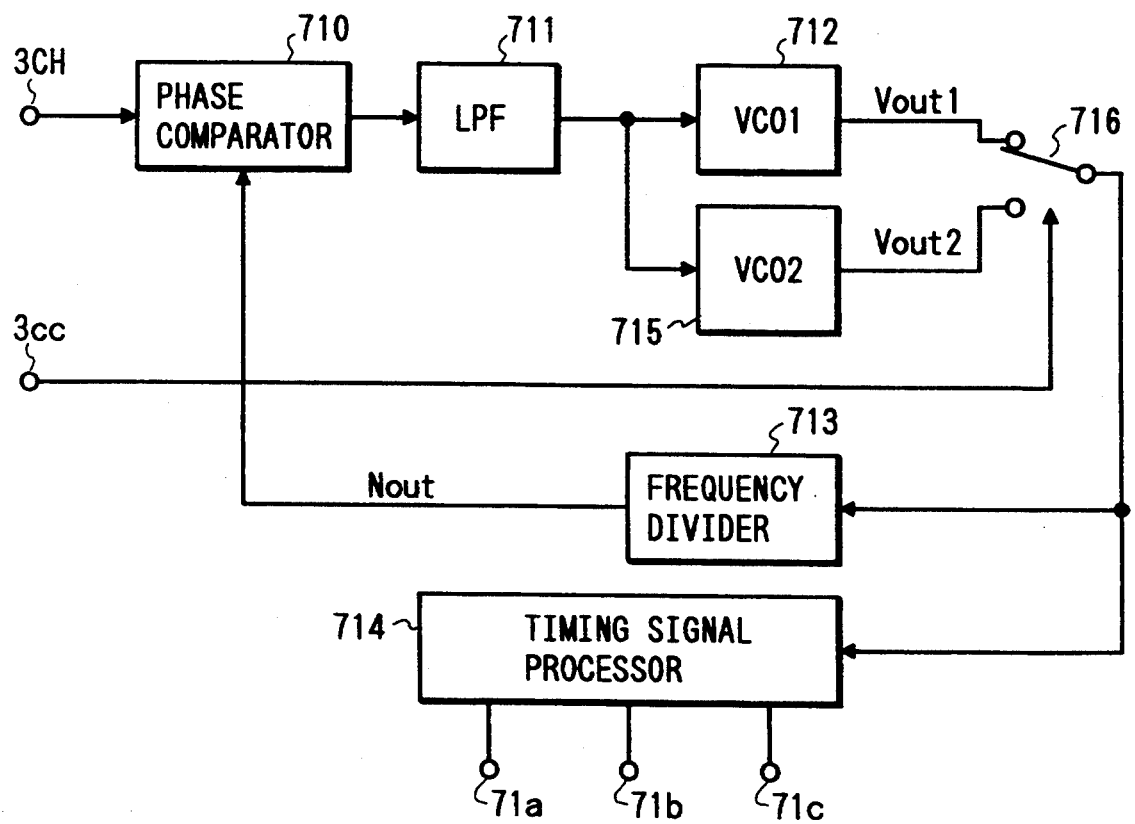
FIG. 9 is a block diagram for showing an example of a configuration of the displaying control circuit in FIG. 7 which is different from FIG. 8.

As a means for forming the timing signals 7a, 7b and 7c required in the displaying control circuit 71, for example, a method for using PLL circuit shown in FIG. 8. In FIG. 8, 710 denotes a phase comparator, 711 denotes an LPF, 712 denotes a VCO, Vout denotes an output of VCO, 713 denotes a frequency divider, Nout denotes an output of the frequency divider, and 714 denotes a timing signal forming circuit. In FIG. 8, as the phase comparator signal 3CH, a horizontal synchronous signal is applied. In FIG. 8, in case that the horizontal synchronous signal 3CH is applied to the phase comparator 710, phases of the horizontal synchronous signal 3CH is coincided with that of the output Nout of the frequency divider, thereby the phase of the output Vout of VCO is always coincided with the phase of the horizontal synchronous signal 3CH so as to prevent the video image from being disturbed. In turn, in case that there is no signal in which the horizontal synchronous signal 3CH is not applied to the phase comparator 710, VCO 712 is in its free run state, so that a free run oscillation frequency of VCO 712 is set in advance in such a way as a frequency of the output Nout of the frequency divider is approximately coincided with a frequency of the horizontal synchronous signal 3c in advance. Provided that if any signal of the NTSC mode, PAL mode and SECAM mode can be displayed as disclosed in the preferred embodiment shown in FIG. 7, it is preferable to set a free run frequency of VCO 712 by coinciding it with any one of the NTSC mode or PAL mode and SECAM mode due to the fact that NTSC mode shows 15.734 kHz, PAL mode and SECAM mode show 15.625 kHz for the different frequencies of the horizontal synchronous signal 3c. As shown in FIG. 9, there is a method in which two types of VCO 712 and VCO 715 are provided and the aforesaid two types of VCC 712 and 715 are changed over in response to a signal 3cc showing a system of the playing-back signal 1a. In this case, it may be fixed to any one of them (it may be fixed to any VCO).

Figure 10:
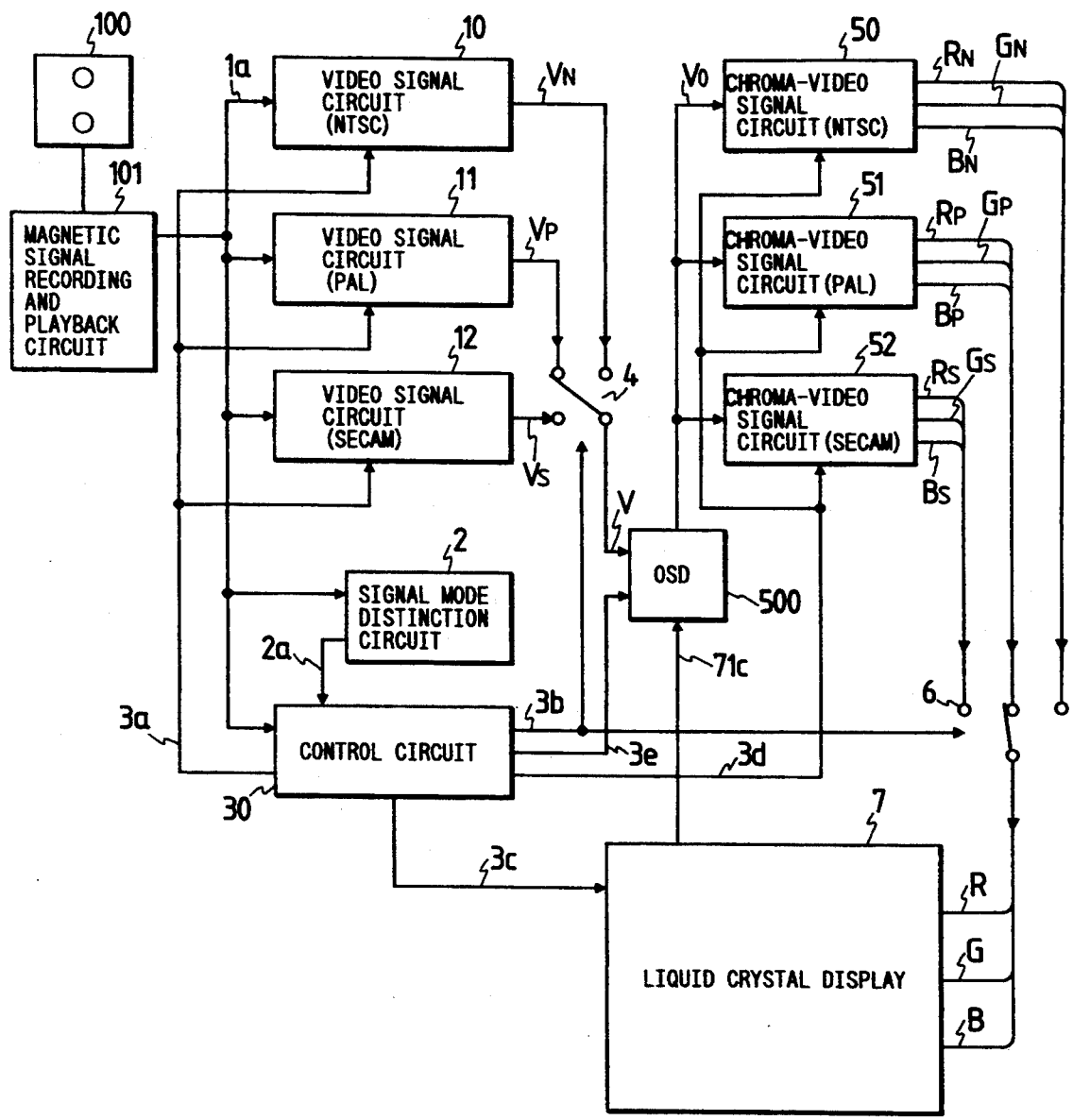
FIG. 10 is a block diagram for showing the multi-mode displaying device integral with the video signal recording and play-back device as a fifth preferred embodiment of the present invention.

A still further preferred embodiment of the present invention is illustrated in FIG. 10. A different feature of the preferred embodiment shown in FIG. 10 is different from that of FIG. 7 consists in the fact that the on-screen information information 3e is not the primary color signals of R, G, B, but is mixed with the complex video signal V. Even in case of the preferred embodiment shown in FIG. 10, the timing signal 71c is outputted to the on-screen display circuit 500, thereby the screen may not be disturbed in case of weak electric field and in case of no signal and then the on-screen display can be performed.

Figure 11:
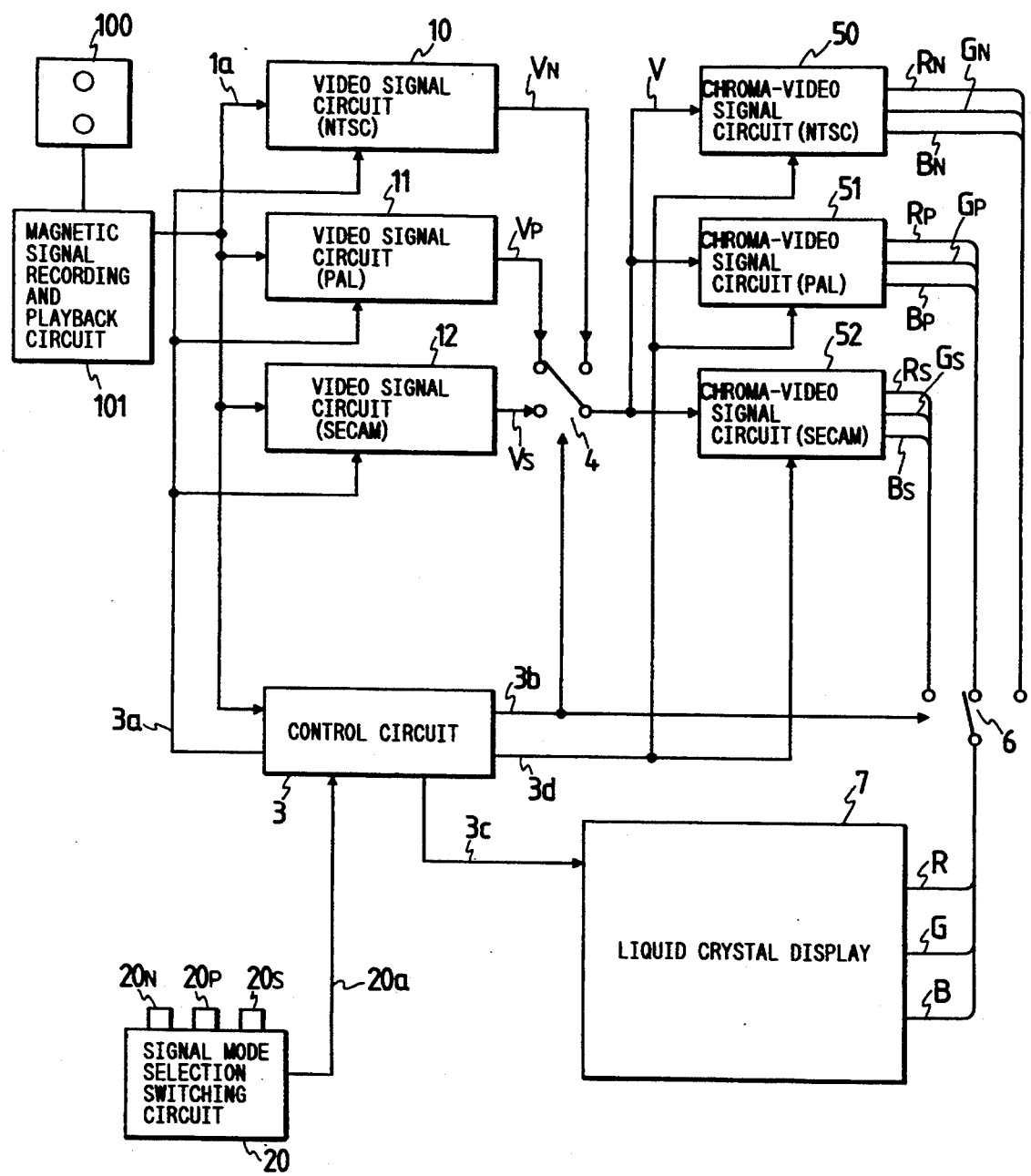
FIGS. 11, 12, 13 and 14 are block diagrams for showing other preferred embodiments of the video signal play-back device of the present invention, respectively.

In FIG. 1, the signal discrimination corresponding to the signal mode and the recording and playing-back mode is automatically realized by the signal mode discrimination circuit 2. However, there is sometimes a case in which the aforesaid mode is mechanically specified through a selection of a button or the like. The preferred embodiment in this case is shown in FIG. 11. In FIG. 11, reference numeral 20 denotes a signal mode selection switch circuit, reference numeral 20a denotes a mode discrimination signal corresponding to 2a in FIG. 1, reference numeral 20N denotes a selection switch of NTSC mode signal, reference numeral 20P denotes a selection switch of PAL mode signal and reference numeral 20S denotes a selection switch of SECAM mode signal.

In FIG. 11, the preferred embodiment is constructed such that the discrimination of the signal mode is manually selected by using the signal mode selection switch circuit 20. Even in case of using the configuration shown in FIG. 11, it is possible to perform a changing-over operation between the video signal selection switch 4 and the displaying selection switch 6 in the same manner as that of the preferred embodiments shown in FIGS. 1 to 10.

As regards the mode changing-over operation for SP, LP and EP or the like, the preferred embodiment shown in FIG. 11 can be applied.

Figure 12:
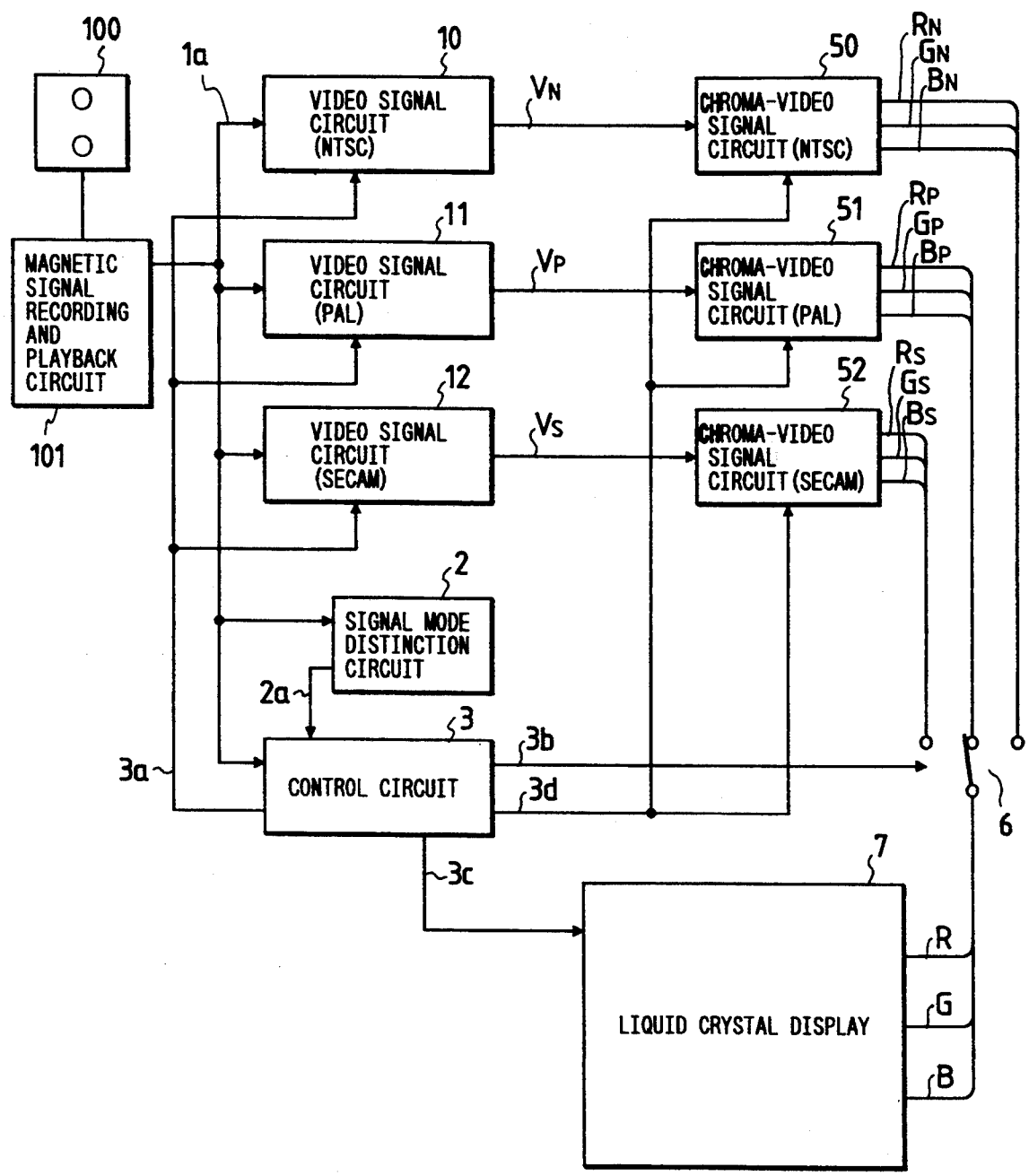

FIG. 12 is a block diagram for showing a still another preferred embodiment of the present invention. In FIG. 12, each of the complex video signals VN, Vp and Vs is directly applied to the NTSC mode, PAL mode and SECAM mode croma-video signal circuits, respectively. Applying the circuit shown in FIG. 12 enables the configuration to be simplified more as compared with the case shown in FIGS. 1 to 11 and at the same time the displaying selection switch 6 is changed over to select the proper signal and to display it.

Figure 13:
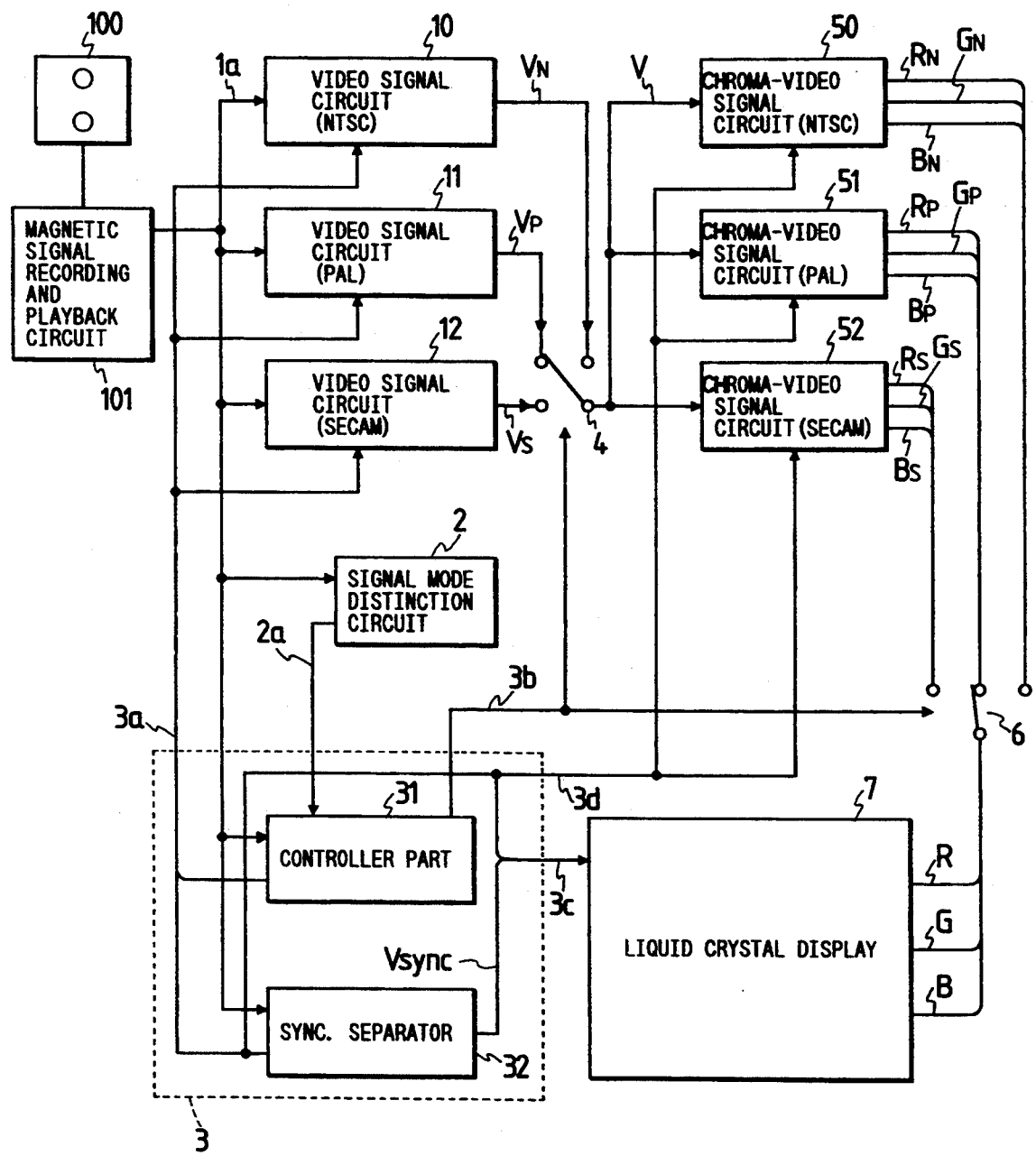

FIG. 13 is a block diagram for showing a still further preferred embodiment of the present invention and illustrates also the example of the practical configuration of the control circuit 3 shown in FIG. 1. In FIG. 13, reference numeral 31 denotes a controlling part, 32 denotes a synchronous separating circuit or a synchronous signal forming circuit, 3d denotes a horizontal synchronous signal and Vsync denotes a vertical synchronous signal.

In FIG. 13, in case of the video signal circuits 10, 11 and 12, a horizontal synchronous signal is utilized at AGC part or a clamp part, for example, a horizontal synchronous signal is utilized at the clamp part or a burst gate part in case of the croma-video signal circuits 50, 51 and 52, for example, and a horizontal synchronous signal is utilized in the liquid crystal displaying device 7 for use in performing the synchronous scanning operation. Due to this fact, in FIG. 13, the aforesaid horizontal synchronous signal is commonly supplied to each of the aforesaid video signal circuits 10, 11, 12 and each of the aforesaid croma-video signal circuits 50, 51, 52 as well as with the aforesaid liquid crystal displaying device 7, thereby each of the aforesaid circuits can be controlled in a substantial same timing and an application of the common circuit enables the configuration to be simplified.

Figure 14:
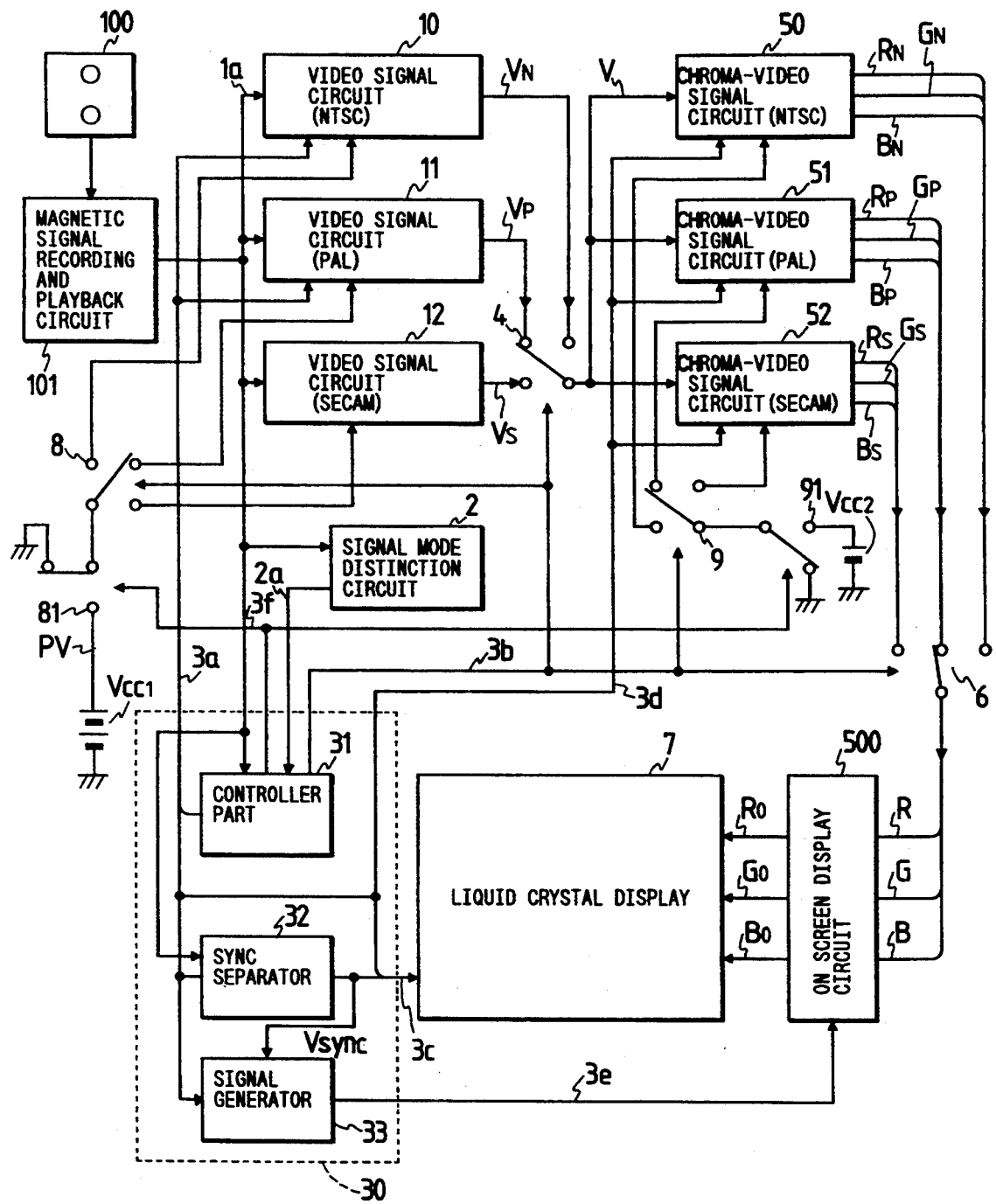

FIG. 14 is a block diagram for showing a still further preferred embodiment of the present invention and illustrates a practical example of configuration of the control circuit 30 in FIG. 4. In FIG. 14, reference numeral 33 denotes a character and figure information generating circuit.

In FIG. 14, the horizontal synchronous signal 3d and the vertical synchronous signal Vsync for use in performing a synchronous scanning are supplied to the liquid crystal displaying device 7 and at the same time applied to the character and figure information generating circuit for use in displaying the on-screen display. With this arrangement, the liquid crystal displaying device 7 and the character and figure information generating circuit 33 can be operated in a substantial same timing, resulting in that no disturbance in on-screen is found.

The preferred embodiments of the present invention have been illustrated in FIGS. 1 to 14. In FIGS. 1 to 12, each of the signals 3a, 3b, 3c and 3d has been separately illustrated, and the aforesaid signals 3a, 3b, 3c and 3d may also be combined into one control signal in view of the practical configuration. In case of the preferred embodiments shown in FIGS. 1 to 12, the displaying selection switch 6 has been described as one for changing-over the primary color signals. Even if there is a modification such as a changing-over of a color difference signal (R−Y, G−Y, B−Y) of the NTSC mode, PAL mode and SECAM mode by using the aforesaid displaying selection switch 6, a similar effect as found in the preferred embodiments shown in FIGS. 1 to 12 can be attained.

In the aforesaid description, the example of playing-back the video tape of VHS standard has been described and a similar effect can be attained for the case in which signals recorded in the video tape of B standard or 8-mm video standard or other recording media are to be played back. As the displaying device, the liquid crystal displaying device has been described, and a similar effect can be expected in case that other display devices such as CRT (a cathode ray tube) or a plasma display and the like are used.

According to the present invention, since the control circuit for controlling an operation of multi-mode video singal recording and playing-back circuit and its output changing-over operation and a control signal can be made in common with the control circuit for controlling a changing-over output of the multi-mode displaying device and the control signal, a size of the circuit can be reduced and at the same time a circuit configuration can be simplified.

Since the operation of the circuit not related to the displaying operation can be controlled or stopped by using the common control circuit and the control signal, the present invention has such effects in which the non-required interference can be prevented and the consumption power can be reduced.

What is claimed is:

1. A multi-mode video signal playing-back and displaying apparatus comprising:

a video signal recording and playing-back part composed of a signal playing-back means for playing-back a signal recorded on a recording medium and a signal recording and playing-back means composed of first and second recording and playing-back circuits for performing processings corresponding to several types of signal modes on said video signal played back from said recording medium by said signal playing-back means;

a displaying part composed of signal processing means including first and second chrominance video circuits for performing color signal processings and brightness signal processings corresponding to said several types of signal modes on a video supplied form said signal recording and playing-back means, and displaying means for displaying a signal outputted from said signal processing means;

a changing-over control circuit having means for discriminating a PAL mode video signal and a SECAM mode video signal and performing a selection of one of outputs of said first and second signal recording and playing-back circuits of said signal recording and playing-back means contained in said video signal recording and playing-back part and a selection of one of outputs of said chrominance video circuits of said signal processing means by use of a common changing-over control signal in response to a result of discrimination by said discriminating means;

wherein said video signal recording and playing-back part, said displaying part and said changing-over control circuit are substantially integrally constructed.

2. A multi-mode video signal playing-back and displaying apparatus comprising:

a video signal recording and playing-back part composed of a signal playing-back means for playing-back a signal recorded on a recording medium and a signal recording and playing-back means composed of first and second recording and playing-back circuits for performing processings corresponding to several types of signal modes on said video signal played back from said recording medium by said signal playing-back means;

a displaying part composed of signal processing means including first and second chrominance video circuits for performing color signal processings and brightness signal processings corresponding to said several types of signal modes on a video supplied from said signal recording and playing-back means, and displaying means for displaying a signal outputted from said signal processing means;

a changing-over control circuit having a function for terminating operation of one of said first and second recording and playing-back circuits corresponding to a PAL signal mode or a SECAM signal mode or color signal and brightness signal processings of one of said first and second chrominance video circuits, or for shielding an output signal and displaying in mono-color on said displaying means when signals recorded in an LP mode in said PAL signal mode or SECAM signal mode in a VHS standard on said recording medium are played back;

wherein said video signal recording and playing-back part, said displaying part and said changing-over control circuit are substantially integrally constructed.

3. A multi-mode video signal playing-back and displaying apparatus according to one of claims 1 and 2, wherein said changing-over control circuit has a function for operating only one of said first and second recording and playing-back circuits corresponding to a result of discrimination.

4. A multi-mode video signal playing-back and displaying apparatus comprising:

a video signal recording and playing-back part composed of signal playing-back means for playing-back a signal recorded on a recording medium, and a signal recording and playing-back means composed of first and second recording and playing-back circuits for processing a video signal played back from said recording medium by said signal playing-back means;

a displaying part composed of signal processing means including first and second signal processing means for processing a video signal supplied from said signal recording and playing-back means, and displaying means for displaying a signal outputted from said signal processing means;

sensing means for sensing a frequency of a synchronous signal contained in said video signal played back from said recording medium by said signal playing-back means, said synchronous signal having a field frequency different from other signals recorded on said recording medium; and changing-over control means for selecting one of said first and second video signals recording and playing-back circuits of said signal recording and playing-back means contained in said video signal recording and playing-back part in response to an output from said sensing means and selecting one of said first and second signal processing circuits of said signal processing means contained in said displaying part in response to the output from said sensing means;

wherein said video signal recording and playing-back part, said displaying part, said sensing part and said changing-over control means are substantially integrally constructed.

5. A multi-mode display device integral with a video signal play-back device according to one of claims 2 and 4, wherein said changing-over control circuit mechanically selects and specifies a discrimination of several types of signal modes with a button switch or the like.

6. A multi-mode video signal playing-back and displaying apparatus according to claim 4 using a matrix mode displaying device as said displaying means, said matrix mode display device having a predetermined number of pixels appropriate for displaying an NTSC standard signal, wherein said changing-over control circuit has a function to change over a scanning state of said matrix mode displaying device in response to a result of discrimination of NTSC, PAL or SECAM signal modes, subtracting video information for every predetermined scanning line and displaying it when a PAL or SECAM signal mode signal having a larger number of scanning lines than that of the NTSC signal mode is to be displayed;

wherein said matrix mode displaying device displays video information every predetermined number of scanning lines when either PAL or SECAM standard signals having more scanning lines than that of NTSC standard signal is displayed.

7. A multi-mode video signal playing-back and displaying apparatus comprising:

a video signal playing-back part composed of a plurality of signal playing-back circuits for performing a signal processing and a luminance signal processing in response to a plurality of types of signal modes when the signal recorded on a recording medium is played back;

a displaying part composed of a plurality of chrominance video signal circuits corresponding to said plurality of signal modes and a displaying device for commonly displaying said plurality of signal modes;

separation means for separating a synchronous signal contained in said video signal being played back or means for forming a timing signal in synchronism with said synchronous signal;

an on-screen display circuit composed of a character and figure information generating circuit and a display circuit;

said displaying device being a matrix type display device for displaying in common outputs of said plurality of chrominance video circuits; and scanning control means for forming a scanning timing signal of said matrix type display device in response to a horizontal and a vertical synchronous signal outputted from said synchronous signal separation means or said timing signal forming means and forming a display timing signal of said on-screen display circuit, wherein an output from said scanning control means is connected to said matrix type display device and said on-screen display circuit;

wherein each of said chrominance video signal circuits has a clamp circuit or a burst gate circuit, an output of said scanning control means is connected to said on-screen display circuit and said clamp circuit or said burst gate circuit.

8. A multi-mode video signal playing-back and displaying apparatus comprising:

a video signal recording and playing-back part composed of a signal playing-back means for playing-back a signal recorded on a recording medium and a signal recording and playing-back means composed of first and second recording and playing-back circuits for performing processings corresponding to several types of signal modes on said video signal played back from said recording medium by said signal playing-back means;

a displaying part composed of signal processing means including first and second chrominance video circuits for performing color signal processings and brightness signal processings responding to said several types of signal modes on a video supplied form said signal recording and playing-back means, and displaying means for displaying a signal outputted from said signal processing means;

wherein each of output signals of said first and second video signal playing-back circuits is directly connected to one of said first and second chrominance video circuits of the same signal model wherein said video signal recording and playing-back part and said displaying part are substantially integrally constructed.

\* \* \* \* \*